United States Patent
Brown et al.

(10) Patent No.: US 12,225,288 B2
(45) Date of Patent: Feb. 11, 2025

(54) SOFTWARE CAMERA VIEW LOCK ALLOWING EDITING OF DRAWING WITHOUT ANY SHIFT IN THE VIEW

(71) Applicant: FARO Technologies, Inc., Lake Mary, FL (US)

(72) Inventors: Matthew T. Brown, Spokane, WA (US); Derik J. White, Ocean Park, WA (US)

(73) Assignee: FARO Technologies, Inc., Lake Mary, FL (US)

( * ) Notice: Subject to any disclaimer, the term of this patent is extended or adjusted under 35 U.S.C. 154(b) by 161 days.

(21) Appl. No.: 18/122,000

(22) Filed: Mar. 15, 2023

(65) Prior Publication Data
US 2023/0300459 A1  Sep. 21, 2023

Related U.S. Application Data

(60) Provisional application No. 63/320,242, filed on Mar. 16, 2022.

(51) Int. Cl.
| | |
|---|---|
| *H04N 23/667* | (2023.01) |
| *G06T 5/50* | (2006.01) |
| *G06T 15/00* | (2011.01) |
| *G06V 10/24* | (2022.01) |
| *G06V 10/74* | (2022.01) |
| *H04N 23/63* | (2023.01) |

(52) U.S. Cl.
CPC ............ *H04N 23/667* (2023.01); *G06T 5/50* (2013.01); *G06T 15/00* (2013.01); *G06V 10/24* (2022.01); *G06V 10/761* (2022.01); *H04N 23/631* (2023.01); *G06T 2207/20221* (2013.01)

(58) Field of Classification Search
CPC ...... H04N 23/667; H04N 23/631; G06T 5/50; G06T 15/00; G06T 2207/20221; G06V 10/24; G06V 10/761; G01S 17/86; G01S 17/894; G01S 7/4817; G08B 13/19608
See application file for complete search history.

(56) References Cited

U.S. PATENT DOCUMENTS

| | | | |
|---|---|---|---|
| 9,908,048 B2 * | 3/2018 | Osman | H04N 13/344 |
| 2015/0055830 A1 * | 2/2015 | Datta | G06T 7/251 |
| | | | 382/103 |
| 2022/0130150 A1 * | 4/2022 | Olmstead | H04N 7/18 |

\* cited by examiner

*Primary Examiner* — Gevell V Selby
(74) *Attorney, Agent, or Firm* — McCarter & English, LLP; Dave S. Christensen

(57) ABSTRACT

A software camera lock is provided. A first image is displayed as a 3D image, wherein a semi-transparent second image overlays the first image. A software camera is inserted at a fixed location in the 3D image, wherein the software camera provides a field-of-view (FOV) displaying a portion of the 3D image, the FOV displaying a first reference in the FOV, the second image displaying a second reference that represents first reference and comprising an object. Software camera is locked in FOV using a lock software camera mode. A model is inserted in first image to match a location of the object in second image, wherein locking the software camera in the FOV causes the FOV of the first image to be maintained in place as the model is being moved in the first image to match the location of the object in second image.

20 Claims, 12 Drawing Sheets

700

OPTIONALLY, OPEN A SEPARATE WINDOW CONTAINING A 2D IMAGE (2D VIEW) OF THE MODELS IN 3D IMAGE CURRENTLY BEING DISPLAYED IN THE LOCK CAMERA MODE 716

REPEATEDLY REVIEW AND POSITION THE MODELS IN THE 2D IMAGE (2D VIEW) IN THE LOCK CAMERA MODE WHICH CONCURRENTLY REPOSITIONS THE MODELS IN THE 3D IMAGE, AND/OR REPOSITION THE MODELS IN THE 3D IMAGE IN THE LOCK CAMERA MODE WHICH CONCURRENTLY REPOSITIONS THE MODELS BEING VIEWED IN THE 2D IMAGE 718

YES — (A) ← ANY MORE MODELS TO INSERT? 720

NO

UNLOCK THE SOFTWARE CAMERA FROM THE FIELD-OF-VIEW IN THE 3D IMAGE USING AN UNLOCK CAMERA MODE 722

ANIMATE ONE OR MORE OF THE MODELS IN THE 3D IMAGE IN UNLOCK CAMERA MODE 724

(OPTIONALLY) IN THE EVENT THAT FURTHER EDITING IS NEEDED, RECEIVE A (SUBSEQUENT) SELECTION FOR THE LOCK CAMERA MODE AND RETURN TO THE PREVIOUS FIELD-OF-VIEW FOR THE SOFTWARE CAMERA IN THE 3D IMAGE 726

SOFTWARE CAMERA VIEW LOCK ALLOWING EDITING OF DRAWING WITHOUT ANY SHIFT IN THE VIEW

CROSS REFERENCE TO RELATED APPLICATIONS

The present application is a nonprovisional of, and claims the benefit of, U.S. Provisional Application Ser. No. 63/320,242 filed on Mar. 16, 2022, the contents of which is incorporated by reference in its entirety.

BACKGROUND

The subject matter disclosed herein relates to the selection of points in a three-dimensional (3D) point cloud, such as that generated by a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D point cloud of data points is formed by the set of three positional coordinates (such as x, y, z) and three color values (such as red, green, blue "RGB"). Processing is generally performed on the 3D point cloud of data points which can include millions of data points. However, additional software processing tools for 3D data points in a 3D point cloud can be helpful to a user.

Accordingly, while existing 3D scanners and existing 3D point cloud processing are suitable for their intended purposes, what is needed is a 3D point cloud processing tool having certain features of embodiments disclosed herein.

BRIEF DESCRIPTION

According to one embodiment, a computer-implemented method for a software camera lock is provided. The method includes displaying a first image in a graphical user interface, the first image being a three-dimensional (3D) image, wherein a second image overlays the first image, the second image being a semi-transparent image such that the first image is viewable through the second image. The method includes inserting a software camera at a fixed location in the 3D image, wherein the software camera provides a field-of-view displaying a portion of the 3D image, the field-of-view displaying at least one first reference in the field-of-view, the second image displaying at least one second reference that represents the at least one first reference, the second image comprising at least one object. Also, the method includes, in response to aligning the at least one second reference to the at least one first reference, locking the software camera in the field-of-view using a lock software camera mode, and inserting a model in the first image to match a location of the at least one object in the second image, wherein locking the software camera in the field-of-view causes the field-of-view of the first image to be maintained in place as the model is being moved in the first image to match the location of the at least one object in the second image. The method includes unlocking the software camera from the field-of-view in the first image using an unlock software camera mode and traversing the model in the first image to capture one or more metrics, the one or more metrics characterizing a traversal of the model through the 3D image, the one or metrics corresponding to the at least one object.

Other embodiments of the present invention implement features of the above-described method in computer systems and computer program products.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 7A and 7B together depict a flow chart of a computer-implemented method for software camera view lock and unlock software camera view in a 3D point cloud according to one or more embodiments;

Figure 1:
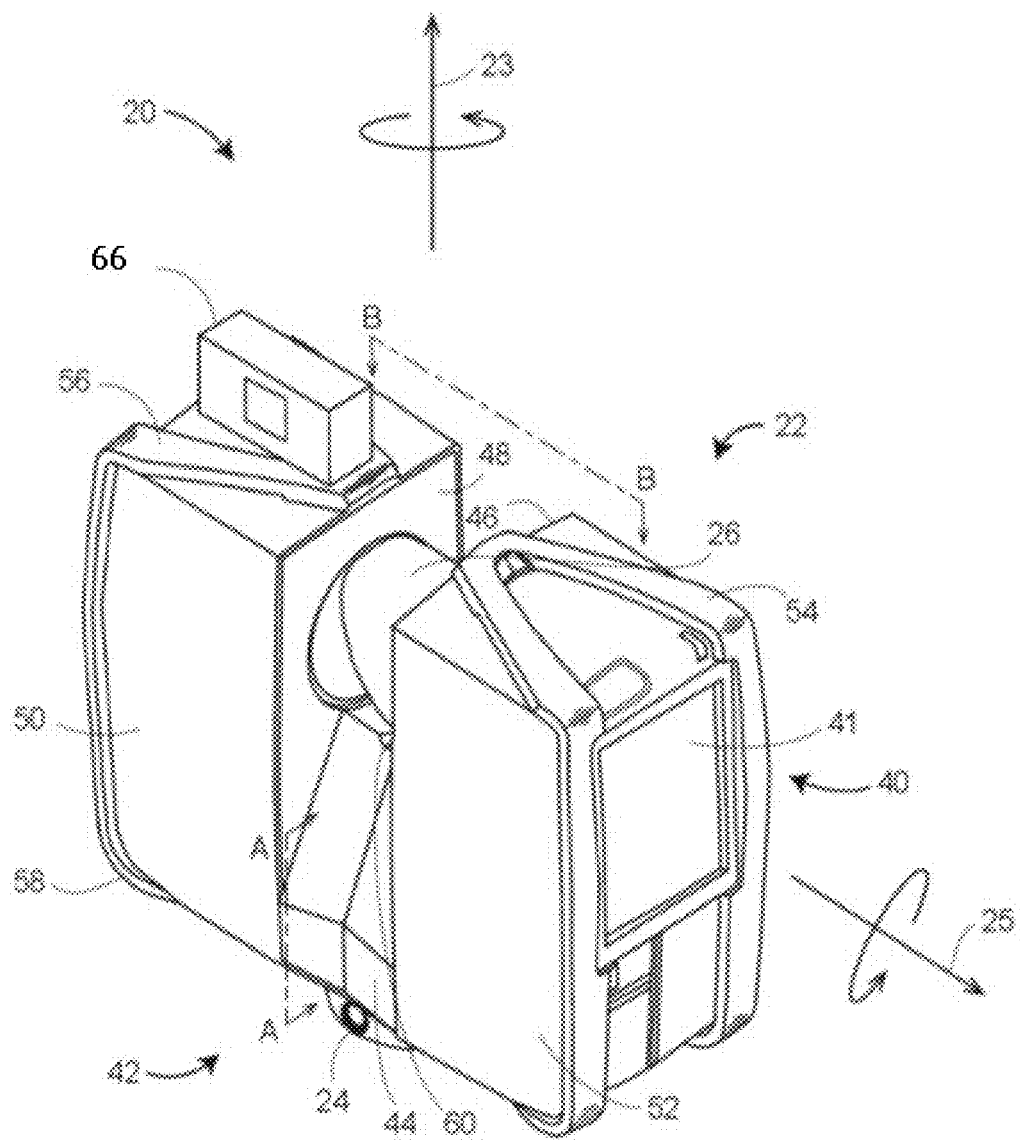
FIG. 1 is a perspective view of a laser scanner in accordance with an embodiment of the invention.

The detailed description explains embodiments of the invention, together with advantages and features, by way of example with reference to the drawings.

DETAILED DESCRIPTION

The present invention relates to a software tool for three-dimensional (3D) point clouds. One or more embodiments of the invention provide advantages in software for 3D images by providing a software camera view lock allowing editing of a drawing without any shift in the view. In one or more embodiments, a user can engage a lock software camera mode, which provides the user the ability to freeze a camera view so that the user can edit the drawing without any view changes. This software tool helps the user align the 3D image to an overlay image (which could be a video, still image, two-dimensional (2D) image) and build the drawing with one or more 3D models, such that the 3D model can be animated to capture one or more metrics that also correspond to an object in the overlay image.

Figure 2:
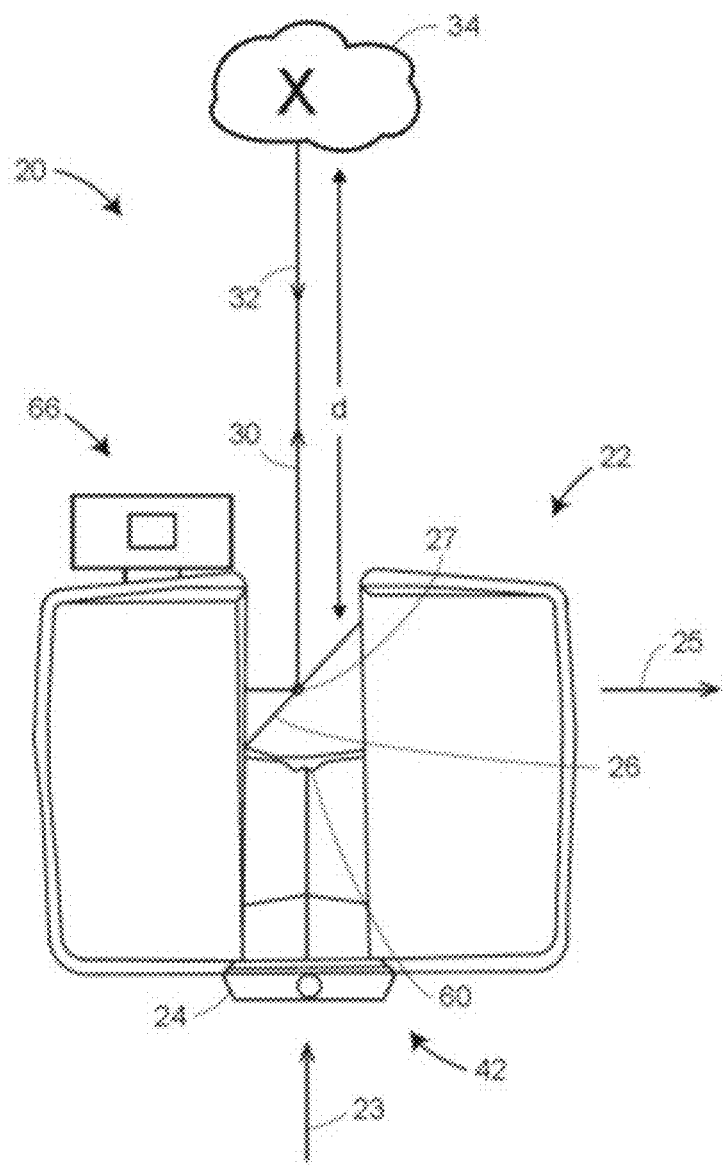
FIG. 2 is a side view of the laser scanner illustrating a method of measurement according to an embodiment.
Figure 3:
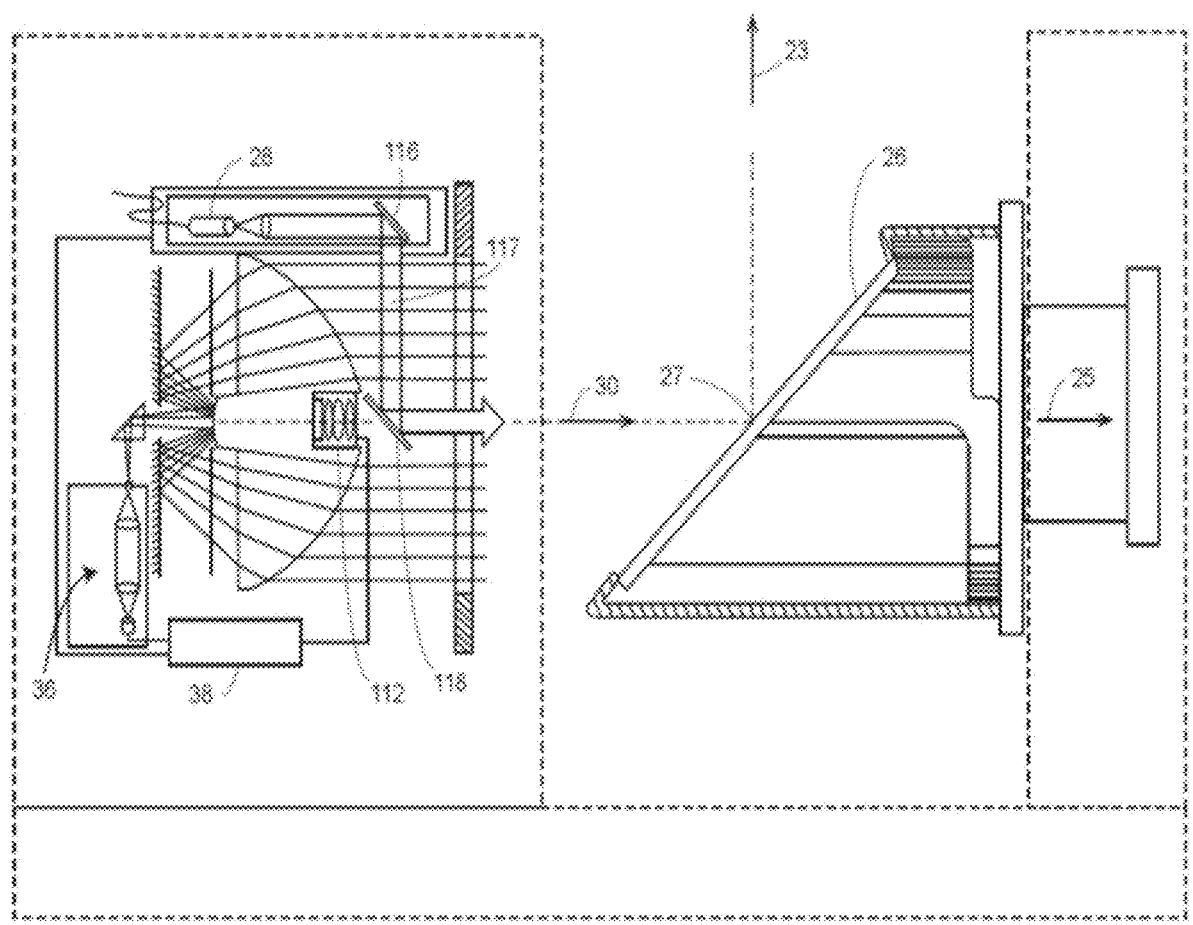
FIG. 3 is a schematic illustration of the optical, mechanical, and electrical components of the laser scanner according to an embodiment.

Referring now to FIGS. 1-3, a coordinate measurement device, such as a laser scanner 20, is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air} = c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
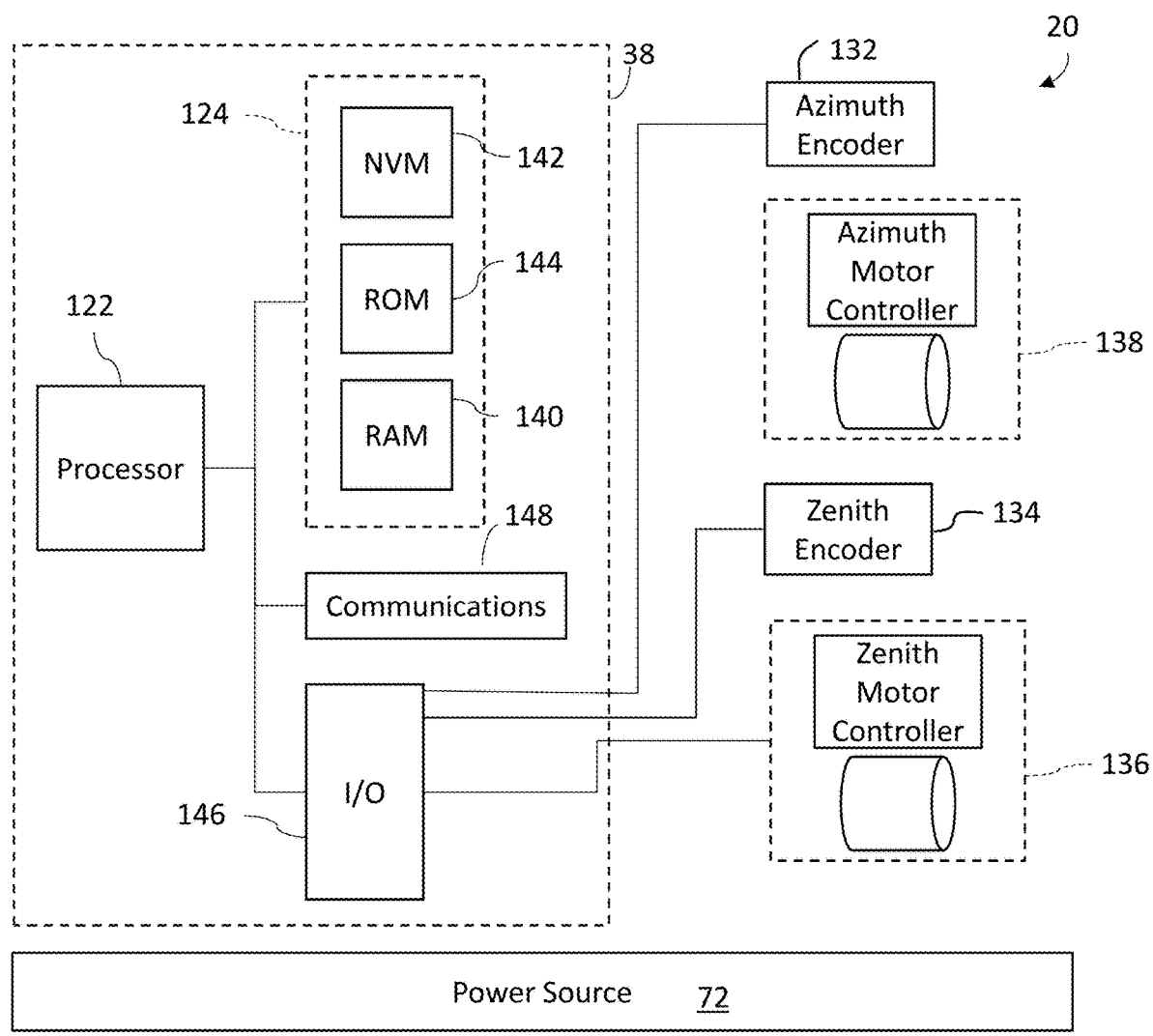
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet (^) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It should be appreciated that while embodiments herein describe a point cloud that is generated by a TOF scanner, this is for example purposes and the claims should not be so limited. In other embodiments, the point cloud may be generated or created using other types of scanners, such as but not limited to triangulation scanners, area scanners, structured-light scanners, laser line scanners, flying dot scanners, and photogrammetry devices for example.

Figure 5:
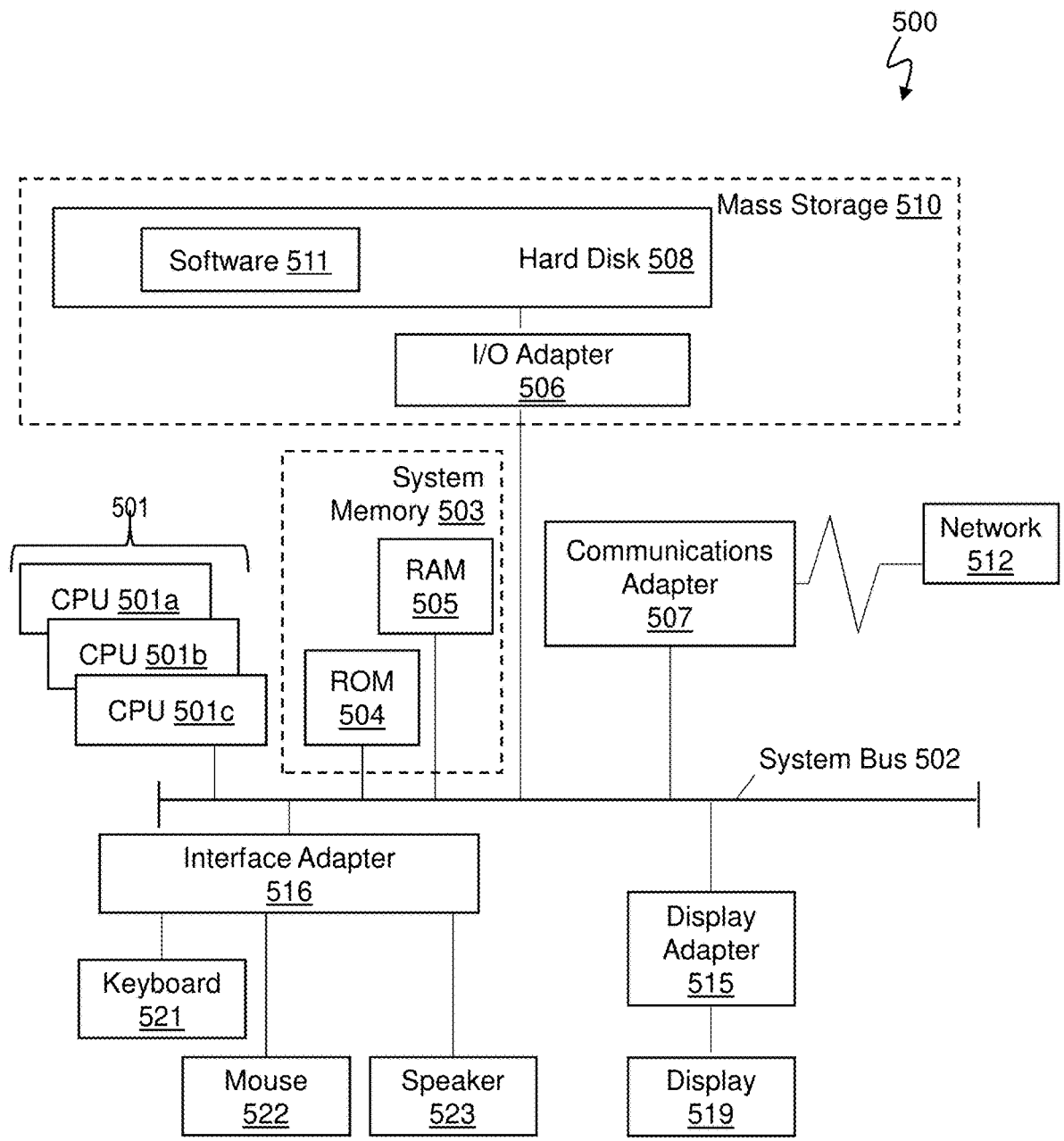
FIG. 5 is a block diagram of an example computer system for use in conjunction with one or more embodiments.

Turning now to FIG. 5, a computer system 500 is generally shown in accordance with one or more embodiments of the invention. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 can be, for example, a server, desktop computer, laptop computer, tablet computer, or smartphone. In some examples, computer system 500 can be a cloud computing node. Computer system 500 can be described in the general context of computer system executable instructions, such as program modules, being executed by a computer system. Generally, program modules can include routines, programs, objects, components, logic, data structures, and so on that perform particular tasks or implement particular abstract data types. Computer system 500 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 5, the computer system 500 has one or more central processing units (CPU(s)) 501a, 501b, 501c, etc., (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and can include a basic input/output system (BIOS) or its successors like Unified Extensible Firmware Interface (UEFI), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 can be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 can be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which can be an outside network, enabling the computer system 500 to communicate with other such systems. In one embodiment, a portion of the system memory 503 and the mass storage 510 collectively store an operating system, which can be any appropriate operating system to coordinate the functions of the various components shown in FIG. 5.

Additional input/output devices are shown as connected to the system bus 502 via a display adapter 515 and an interface adapter 516. In one embodiment, the adapters 506, 507, 515, and 516 can be connected to one or more I/O buses that are connected to the system bus 502 via an intermediate bus bridge (not shown). A display 519 (e.g., a screen or a display monitor) is connected to the system bus 502 by the display adapter 515, which can include a graphics controller to improve the performance of graphics intensive applications and a video controller. A keyboard 521, a mouse 522, a speaker 523, etc., can be interconnected to the system bus 502 via the interface adapter 516, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 5, the computer system 500 includes processing capability in the form of the processors 501, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 can be a cellular network, a radio network, a wide area network (WAN), a local area network (LAN), or the Internet, among others. An external computing device can connect to the computer system 500 through the network 512. In some examples, an external computing device can be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 6:
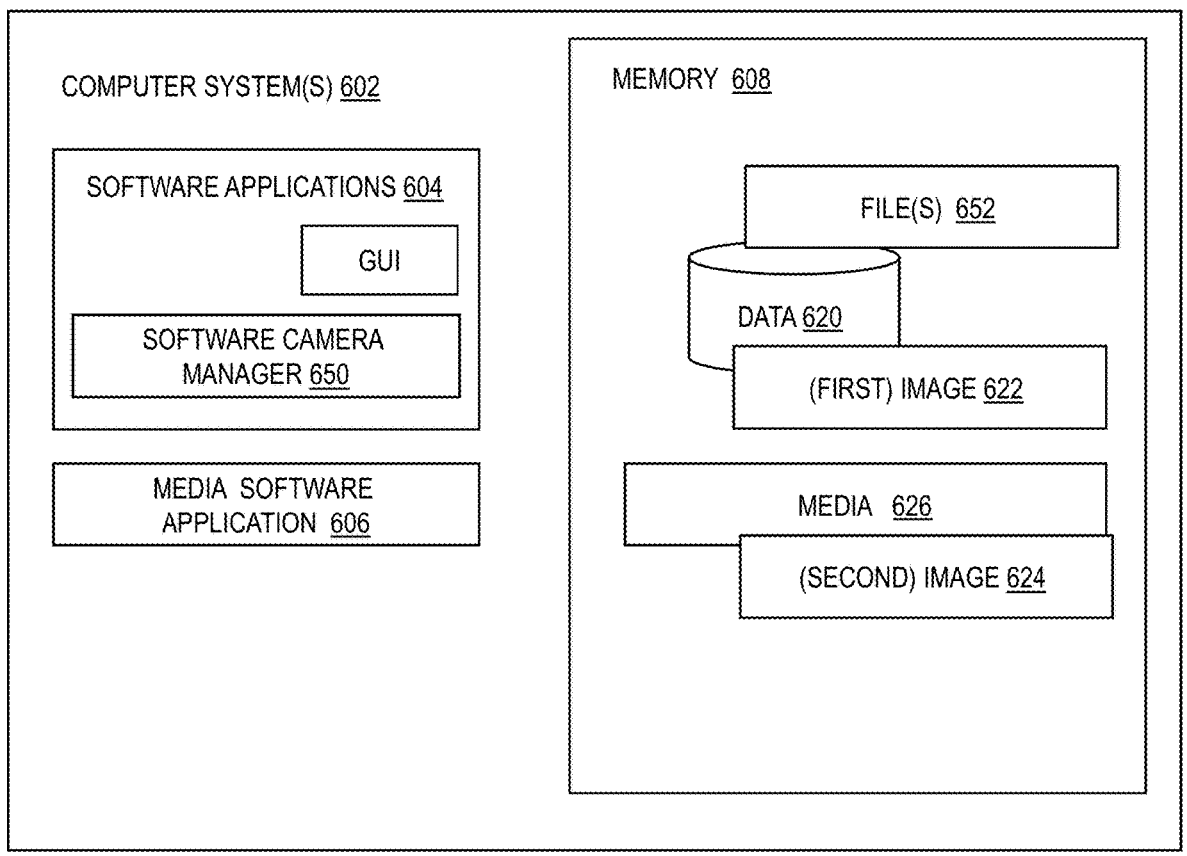
FIG. 6 is a block diagram of a computer system for software camera view lock allowing editing of the drawing without any shift in the view according to one or more embodiments.

FIG. 6 is a block diagram of a computer system 602 for software camera view lock allowing editing of the drawing without any shift in the view according to one or more embodiments. Elements of computer system 500 may be used in and/or integrated into computer system 602. One or more software applications 604, software camera manager 650, and media software application 606 may be implemented as software 511 executed on one or more processors 501, as discussed in FIG. 5. Data 620 in memory 608 can include a 3D point cloud, also referred to as 3D point cloud data, point cloud, a 3D image, etc. The 3D point cloud includes 3D point cloud data points. Data 620 can be generated using laser scanner 20 as discussed in FIGS. 1-4 and/or another suitable three-dimensional coordinate scanning device. Software application 604 can be used with, integrated in, call, and/or be called by other software applications for processing 3D point cloud data as understood by one of ordinary skill in the art. In one or more embodiments, software application 604 can be employed by a user for processing and manipulating 3D point cloud data using a user interface such as, for example, a keyboard, mouse, touch screen, stylus, etc. Software application 604 can include and/or work with a graphical user interface (GUI), and features of the software application 604 can be initiated and selected by a user for editing, drawing, and animating 3D models in the 3D point cloud as discussed herein. As understood by one of ordinary skill in the art, software application 604 includes functionality for processing any 3D image including a 3D point cloud. In one or more embodiments, the software application 604 can include features of, be representative of, and/or be implemented in FARO® Zone 3D Software and/or FARO® Scene Software, all of which are provided by FARO® Technologies, Inc.

The media software application 606 is configured to display any type of media including still images, video images (i.e., moving frames), etc., which can be moved forward and backward in time, paused, skipped, etc., as desired by a user. The media software application 606 may include the features and video processing of typical media applications as understood by one of ordinary skill in the art. The media software application 606 is configured to play media 626 which may be a video, a still image, etc. The media software application 606 is configured with a transparent feature in which the user can select to increase and/or decrease the translucence of the media 626 being displayed. As understood by one of ordinary skill in the art, the translucence feature may cause the opacity of the media 626 to be selectively modified from 0-100% opacity, where 0% opacity is completely translucent while 100% opacity is not translucent. By decreasing the translucence, a background image can be seen through the media 626. Additionally, the media software application 606 may have distortion in one or more objects or items in the media 626 based on the type of camera/video equipment used to capture media 626, and the media software application 606 is configured to remove the distortion of the objects by, for example, straightening one or more objects that may have been curved by the lens of the camera/video equipment. In one or more embodiments, the media software application 606 can be integrated with, work in conjunction with, and/or be called on by the software application 604. The media software application 606 is configured to directly integrate surveillance video into 3D point clouds and models. By calibrating and overlaying the video on top of point cloud software, a user can establish accurate measurements of objects, distances, and heights from the recorded video directly within any 3D modeling software. In one or more embodiments, the media software application 606 can include features of, be representative of, and/or be implemented in the Camera Match Overlay Tool by INPUT ACE. The media software application 606 may be representative of any suitable media software application capable of operating as discussed herein.

The software application 604 provides a lock camera view in software camera lock mode that gives the user the ability to fix or freeze a software camera view, so that the user can edit the drawing without the view changing. As used herein, to fix or freeze the camera view means to maintain the image displayed to the user in a particular pose (location with six-degrees of freedom) within the 3D model/3D-point cloud. In other words, in software camera lock mode, the user cannot scroll, zoom, or pan the displayed view. At any time, the user can select the escape key (e.g., twice) to break out of the locked camera view. In an example scenario using the software camera lock mode, there may be an overlay image which is also referred to as a semi-transparent image that the user wishes to align to the 3D point cloud. In the example embodiments, the overlay image is a two-dimensional (2D) image. The overlay image may be video footage from the same physical location. For example, the video footage having the overlay image can be of a vehicle collision captured by a physical camera positioned at the intersection or a dashboard camera in the real world. Once the 3D point cloud and the overlay image (which may be a frame) of the video footage are aligned, the camera view is locked using the software camera lock mode so that the user can edit the drawing without the view changing in the 3D point cloud. All camera views are saved and can be reselected from the camera manager including locked cameras. Once locked, the software camera stays in software camera lock mode until it is unlocked. The user can still proceed to two-dimensional (2D) mode when the software camera is in software camera lock mode. While the software camera is locked in the 3D mode, the user can zoom, pan, scroll, etc., in the 2D mode. As discussed in more detail herein the 2D mode may be a separate window (e.g., overlaid on one section of the computer screen). This provides a technical improvement in allowing the user to see the view from the camera lock mode (and the associated overlay image) while editing or manipulating the position in 3D space of other digital objects (e.g., a vehicle) in the 3D model/point-cloud.

Figure 7A:
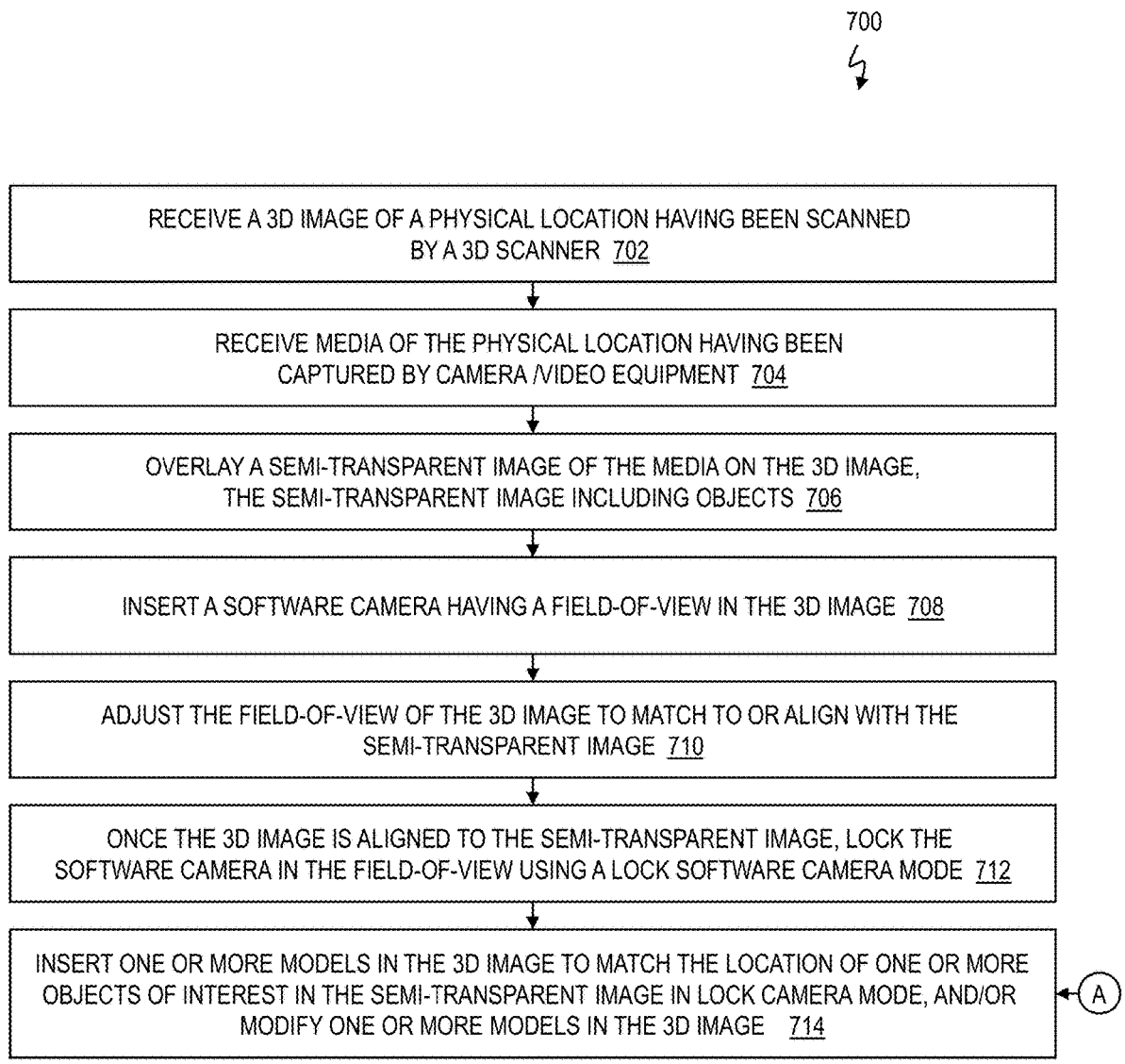

FIGS. 7A and 7B together depict a flow chart of a computer-implemented method 700 for software camera view lock allowing editing of the drawing without any shift in the view according to one or more embodiments. Computer-implemented method 700 may include one or more algorithms executed by software application 604 and/or media software application 606 of computer system 602. On occasions, reference may be made to FIGS. 8 and 9. Processing by software application 604 is generally performed on a 3D image such as a 3D point cloud which can include millions of 3D data points.

At block 702 of the computer-implemented method 700, software application 604 is configured to receive/retrieve a 3D model or image 622 representing a physical location having been scanned by a 3D scanner. In one example, the 3D image 622 may be 3D point cloud data that has been retrieved from data 620. In one or more embodiments, the 3D image 622 may be a point cloud that has been processed or converted into another form, such as a meshed surface for example. At block 704, software application 604 may include, be integrated with, and/or call the media software application 606, where the software application 604 and/or media software application 606 are configured to receive/retrieve media 626 of the physical location which has been captured by a camera and/or video equipment.

Figure 8:
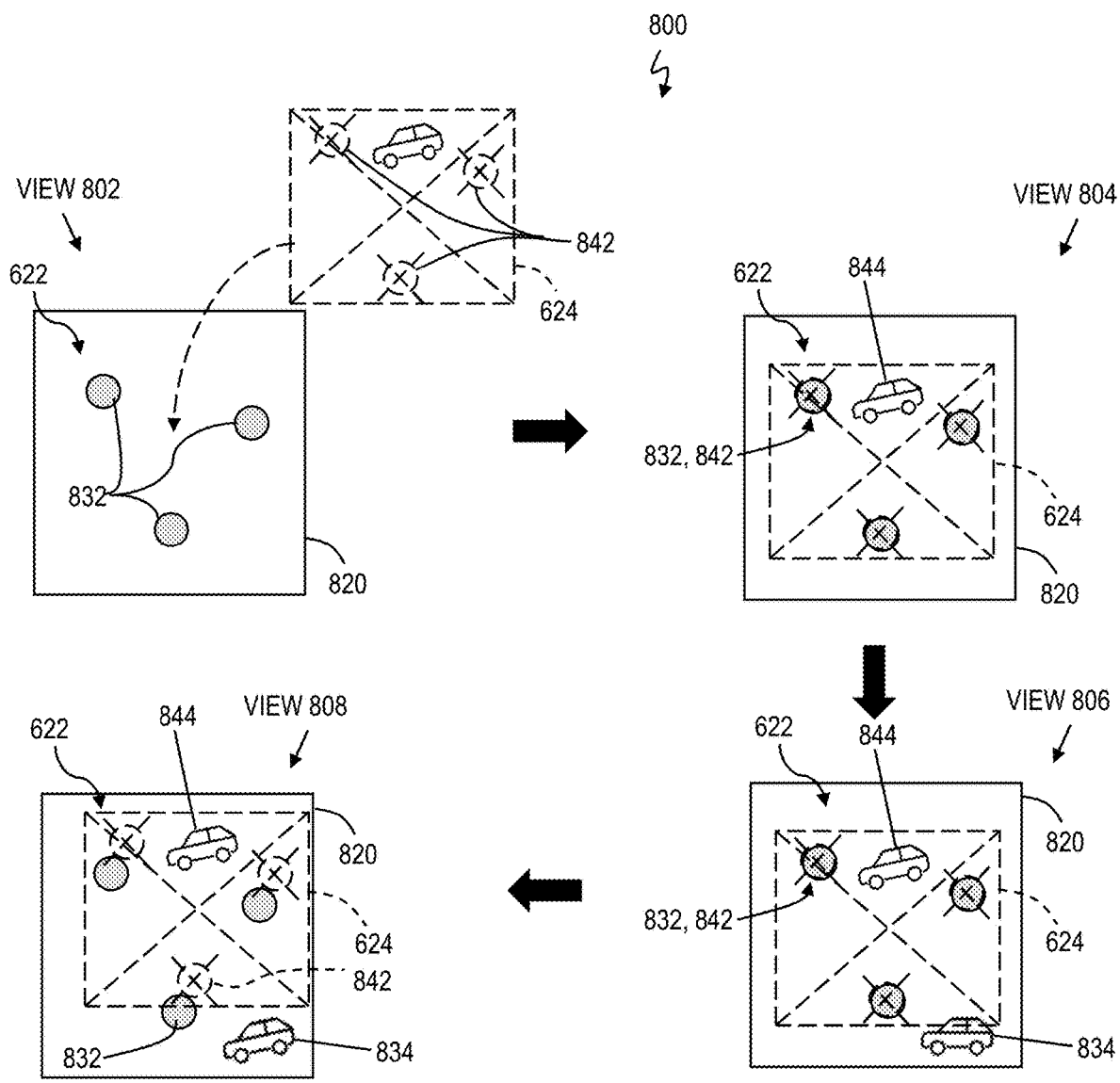
FIG. 8 is a block diagram illustrating a graphical display of various drawing and editing processes using unlock software camera mode according to one or more embodiments.

At block 706, software application 604 and/or media software application 606 can be utilized to overlay a semi-transparent image 624 of the media 626 on the 3D image 622. The semi-transparent image 624 is the overlay image. The software application 604 is utilized to align points/edges on the semi-transparent image 624 with the same points/edges in the 3D image 622 (which may be a 3D point cloud). While the user is aligning fixed references in the 3D image to the same fixed references in the semi-transparent image 624, the user may have to pan, scroll, zoom in, zoom out, move through, etc., the 3D image 622. In this way, the view displayed to the user is substantially the same pose as the device that acquired the semi-transparent image 624. FIG. 8 depicts a block diagram illustrating a graphical display of various drawing and editing processes using software application 604 and/or media software application 606 in unlock software camera mode. As seen in view 802 of FIG. 8, the 3D image 622 includes one or more objects 832 (i.e., references), and the semi-transparent image 624 includes one or more objects 842 (i.e., references). The semi-transparent image 624 is depicted with dashed lines for illustration purposes, but it should be understood that the semi-transparent image 624 could be, for example, video footage, a still image, etc., captured by video/camera equipment in the real world. The objects 832 and 842 are physical objects, such as a car, chair, or weapon for example, in the physical location (i.e., the real world), and the objects 832 and 842 are examples of the fixed references that have points/edges/surfaces (i.e., dimensions). At least one or more of the objects 832 in the 3D image 622 represent the same object(s) as the objects 842 in the semi-transparent image 624. It should be appreciated that while FIG. 8 illustrates the objects 832, 842 as circles, this is for example/clarity purposes and the claims should not be so limited. In view 802, the 3D image 622 is shown in a window 820 and the semi-transparent image 624 can be moved over the 3D image 622 until the objects 842 overlay the objects 832 as depicted in view 804.

Now, that the at least one or more objects 842 in the semi-transparent image 624 have been overlaid or aligned to match and/or correspond respectively to one or more objects 832 in the 3D image 622, software application 604 can be utilized to insert one or more 3D models 834 into the 3D image 622, as depicted in view 806. In this example scenario, the user wishes to align the 3D model 834, such as a vehicle, created in the 3D image 622 with an object 844 of interest (e.g., a vehicle) in the semi-transparent image 624. The 3D model 834 has the same or substantially the same shape and dimensions in the 3D image 622 as the object 844 of interest in the semi-transparent image 624. With or without a software camera inserted, the user can position or manipulate the model 834 which causes the 3D image 622 to shift out of alignment with the semi-transparent image 624, in unlock software camera mode. After manipulation of the model 834, such as rotating the model 834 in 3D space to match the rotation of the object 844 of interest, view 808 illustrates that the 3D image 622 has shifted thereby causing the objects 832 in the 3D image 622 to no longer be aligned with the objects 842 in the 2D view of the semi-transparent image 624, during unlock software camera mode. For example, during unlock software camera mode, the user is unable to select and modify 3D models, such as 3D model 834, on the display screen and keep the 3D image 622 aligned to the semi-transparent image 624 because any attempt pulls the user out of the present view.

Figure 11:
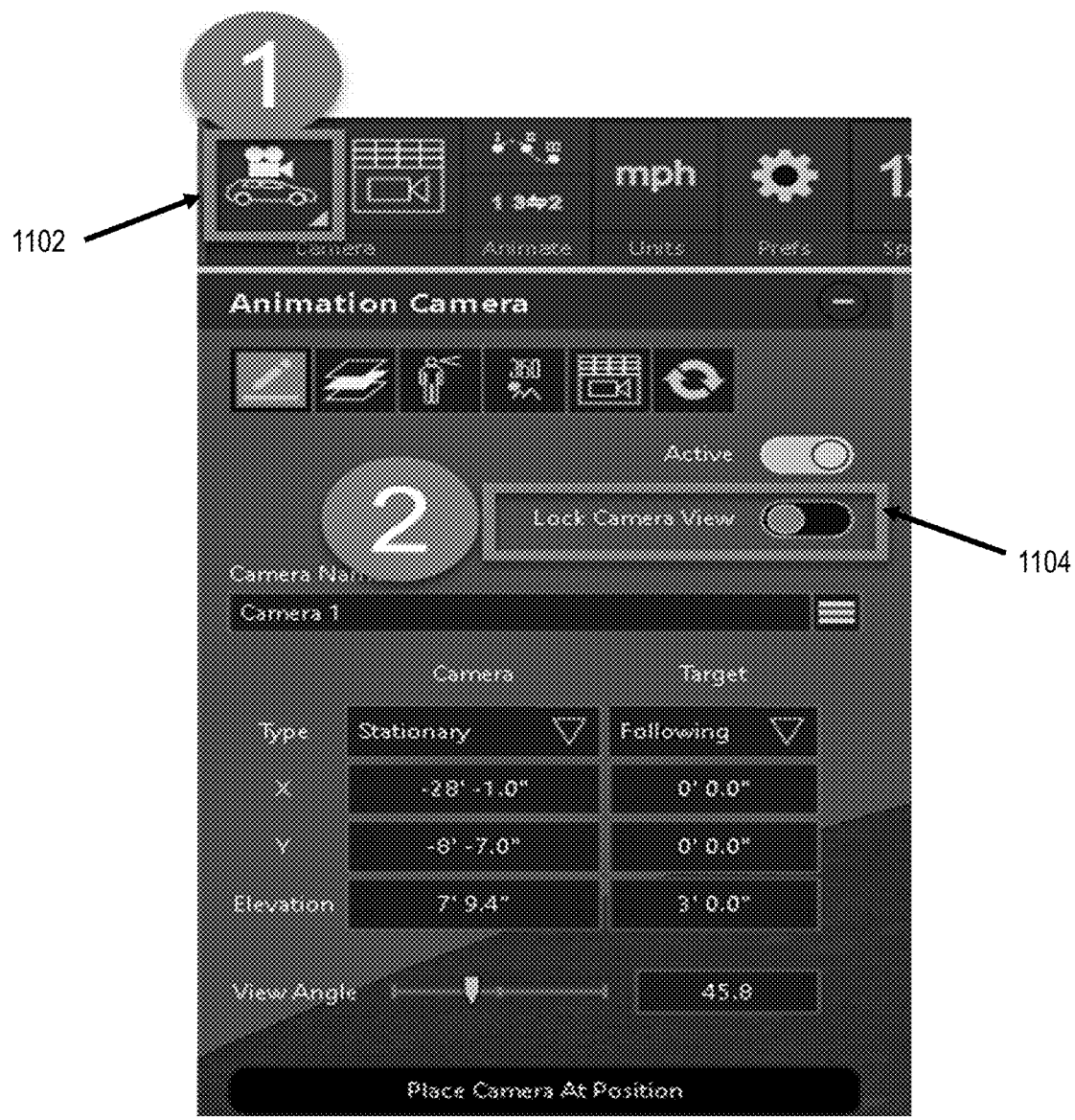
FIG. 11 is a block diagram illustrating an example graphical display of various buttons according to one or more embodiments.

Referring to FIG. 7A, at block 708, software application 604 is utilized to insert a software camera 922 (depicted in FIG. 9) having a predefined field-of-view in the 3D image 622. For example, the user may select a button (e.g., depicted as button 1102 in FIG. 11) in the graphical user interface of software application 604 to insert the software camera 922, and the user can move the software camera 922 to a desired location in order to display the desired field-of-view in the 3D image 622. The software camera 922 captures/displays on the display screen (e.g., display 519) a predefined field-of-view in the 3D image 622. The software camera 922 is a feature of software application 604 that allows the user to control the specific location and vantage point (e.g., pose) of the 3D image 622 that is displayed. In this case, the field-of-view for the software camera 922 displays a field-of-view of the 3D image 622 that coincides with the semi-transparent image 624. In some cases, the software camera 922 can be moved until the field-of-view in the 3D image matches or aligns with the semi-transparent image 624, at block 710. Although the software camera 922 is being discussed now, it should be appreciated that the software camera 922 could have been inserted at any earlier stage. At block 712, upon a selection of a button (e.g., button 1104 depicted in FIG. 11) for lock software camera mode by the user, software application 604 is configured to lock the field-of-view of the software camera 922 in the 3D image 622. At block 714, upon a selection by the user, software application 604 is configured to insert one or more 3D models 834 in the 3D image 622 to match the location of one or more objects 844 of interest in the semi-transparent image 624 in lock software camera mode and/or modify one or more 3D models 834 in the 3D image 622. As noted above, the 3D model 834 is of the same shape and dimension of the object 844 of interest in the semi-transparent image 624. According to one or more embodiments, locking the software camera 922 using the lock software camera mode fixes or freezes the field-of-view being displayed of the 3D image 622 such that, for example, the same 3D points, pixels, etc., are displayed to the user on the display screen even when the user adds 3D models and moves the added 3D models. In other words, the user can move 3D models in 3D space in the 3D image 622 without having the 3D image shift during the moving process. The lock software camera mode disables the scroll, zoom, pan, etc., functionalities in the software application 604. Moreover, navigation in the 3D image is disabled during the lock software camera mode, further preventing any accidental movement in the 3D space.

Figure 9:
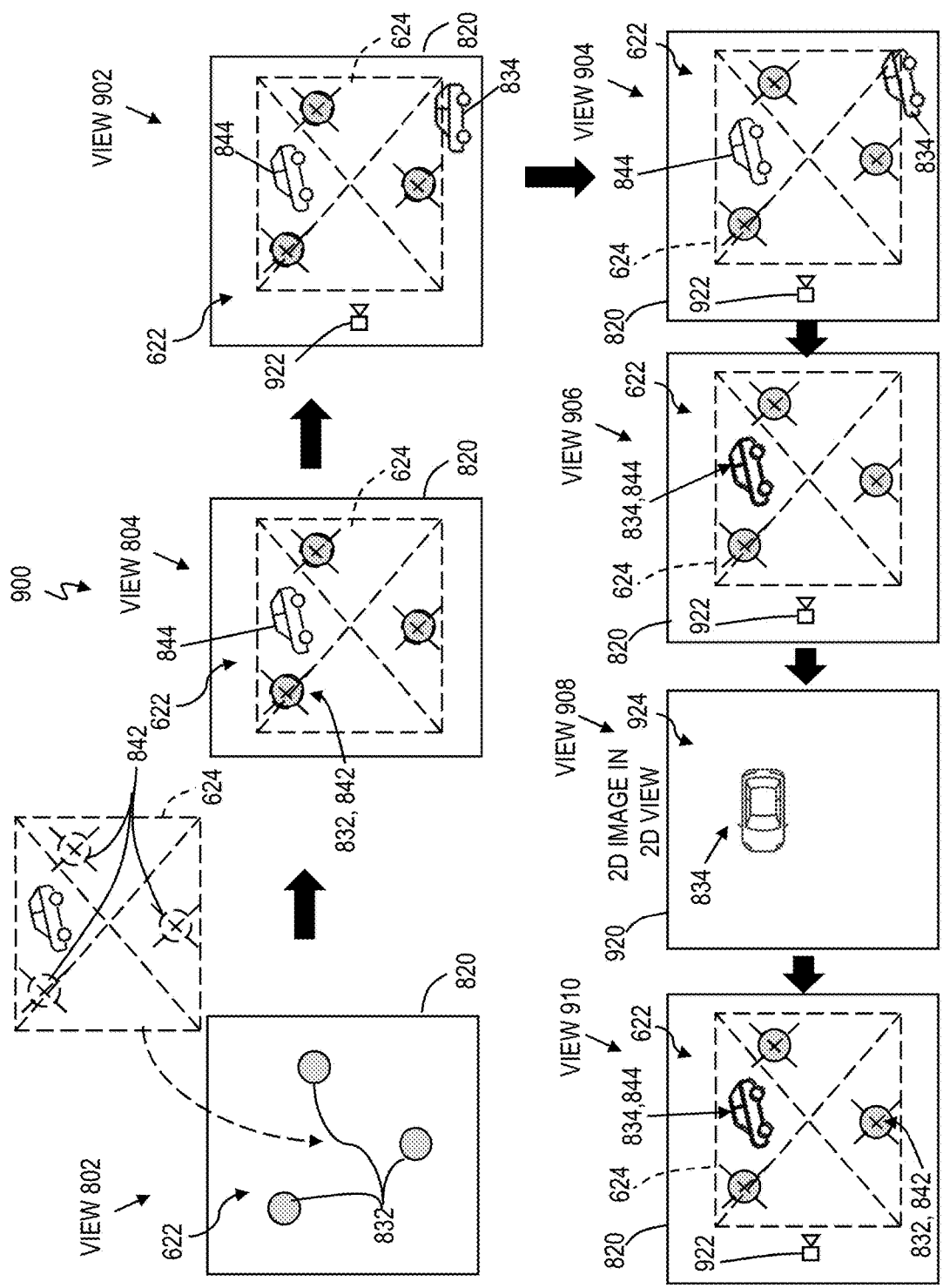
FIG. 9 is a block diagram illustrating a graphical display of various drawing and editing processes using lock software camera mode according to one or more embodiments.

FIG. 9 depicts a block diagram illustrating a graphical display of various drawing and editing processes using software application 604 and/or media software application 606 in lock software camera mode. In FIG. 9, discussion of views 802 and 804 are the same as in FIG. 8 and are not repeated for conciseness. In FIG. 9, view 902 illustrates that the software camera 922 with its field-of-view inserted into the 3D image 622, and the 3D model 834 of a vehicle has been inserted to match the object 844 of interest in the semi-transparent image 624. In software camera lock mode, view 904 illustrates that the 3D model 834 has been manipulated/aligned, i.e., rotated, to match the object 844 of interest, while view 906 illustrates that the 3D model 834 is moved to the same location as object 844 of interest. In particular, the 3D model 834 appears to be positioned directly on top of the object 844 of interest in view 906, such that they both are displayed or appear as a single model 834/object 844. It should be appreciated that since the view displayed to the user is a 2D representation of the 3D image, even though the 3D model 834 appears to be at the same location as object 844 in 2D space, they may not be aligned in 3D space.

Referring to FIG. 7B, at block 716, upon an optional selection by the user, software application 604 is configured to open a separate window 920 containing a 2D image 924 of the 3D image 622 and its 3D model 834 currently being displayed in the lock software camera mode, as seen in view 908. In view 908, the 2D image 924 in window 920 is a 2D view of the 3D image 622 currently displayed in window 820. The windows 820 and 920 are displayed adjacent one another. The window 920 of the 2D image 924 is simultaneously displayed on the display screen (e.g., display 519) with the window 820 of the 3D image 622, such that changes to the model 834 in either window 820, 920 are concurrently reflected in both windows. For ease of illustration and so as not to obscure the figure, a single window 920 having a single 2D image is shown. It should be appreciated that the software application 604 is configured to concurrently display numerous windows 920 each respectively having a different 2D image of a 2D view of the 3D image 622 with the 3D model 834. For example, windows 920 respectively displaying a top view of a 2D image, a side view of a 2D image, a front view of the 2D image, back view of a 2D image, etc., can each simultaneously be displayed along with the field-of-view of the 3D image 622 in window 820.

At block 718, optionally, the software application 604 is configured for the user to repeatedly review and reposition the 3D models 834 in the 2D image 924 (i.e., 2D view) in window 920 and in 3D image 622 in window 820, all of which is in the lock camera software mode. Changes to the 3D model 834 in the 3D image 622 are reflected and displayed in each of the windows 920 showing the various 2D views for the 2D images 924. At block 720, the software application 604 is configured to check whether there are any more 3D models to insert in the 3D image 622. If (YES) there are more 3D models to insert, the flow proceeds to block 714. If (NO) there are not any additional 3D models to insert in the 3D image 622, the software application 604 is configured to unlock the software camera from the fixed field-of-view in the 3D image 622 using the unlock software camera mode, upon a selection by the user, at block 722.

At block 724, upon a selection by the user, the software application 604 is configured to animate one or more 3D models 834 in the 3D image 622 in the unlock software camera mode. Animation of the 3D model 834 causes the 3D model 834 to travel or traverse according to a predefined path set by the user, such that metrics can be captured regarding the traversal of the 3D model 834. Example metrics or measurements may include speed, distance, acceleration, time to be at a certain point along the path given a speed and/or distance, etc.

At block 726, in the event that further editing is needed, the software application 604 is configured to receive a subsequent selection for the lock software camera mode and return to displaying the previous field-of-view for the software camera 922 in the 3D image 622. As noted above, the software application 604 is configured to allow the user to view the 3D image 622 from different perspectives including various 2D perspectives in 2D images and different perspectives in the 3D image 622 to help place and position the 3D model 834. As seen in view 910, the user can (always) return to the fixed camera view (i.e., the previous locked field-of-view of software camera 922 which can be saved in memory 608) by using a software camera manager 650, such that the user can pull up or redisplay the semi-transparent image 624 over the same fixed camera view of the 3D image 622. The software camera manager 650 can be integrated with software application 604 and includes computer-executable instructions to manage the operation of numerous software cameras 922, including the lock software camera mode and unlock software camera mode. For example, the software camera manager 650 is configured to store the fixed field-of-view of software camera 922 in locked software camera mode, as a fixed field-of-view file 652 in memory 608. Although a single field-of-view file 652 is shown in FIG. 1, it should be appreciated that there can be numerous field-of-view files 652 respectively for numerous software cameras 922. After switching from a locked software camera mode to an unlocked software camera mode, and then back to the locked software camera mode for the same software camera 922, the software camera manager 650 is configured to automatically return to (and display) the initial fixed field-of-view for the software camera 922, by retrieving the saved fixed field-of-view file 652 for the software camera 922. Regardless of the number of times the software camera 922 is unlocked and/or the number of edits to 3D models 834, locking the software camera 922 returns it to the same fixed field-of-view in the 3D image 622 for display. In one or more embodiments, the fixed field-of-view file 652 includes the collection of 3D data points displayed in the field-of-view of the 3D image 622. In one or more embodiments, the software camera manager 650 provides an option to create a new (second) fixed field-of-view file 652 and/or return the previously saved fixed field-of-view file 652. In one or more embodiments, the software camera manager 650 provides an option to create multiple fixed field-of-view files 652. It is noted that the semi-transparent image 624 does not move or shift during the editing, and the user can choose to display or not display the semi-transparent image 624 as desired.

Figure 10:
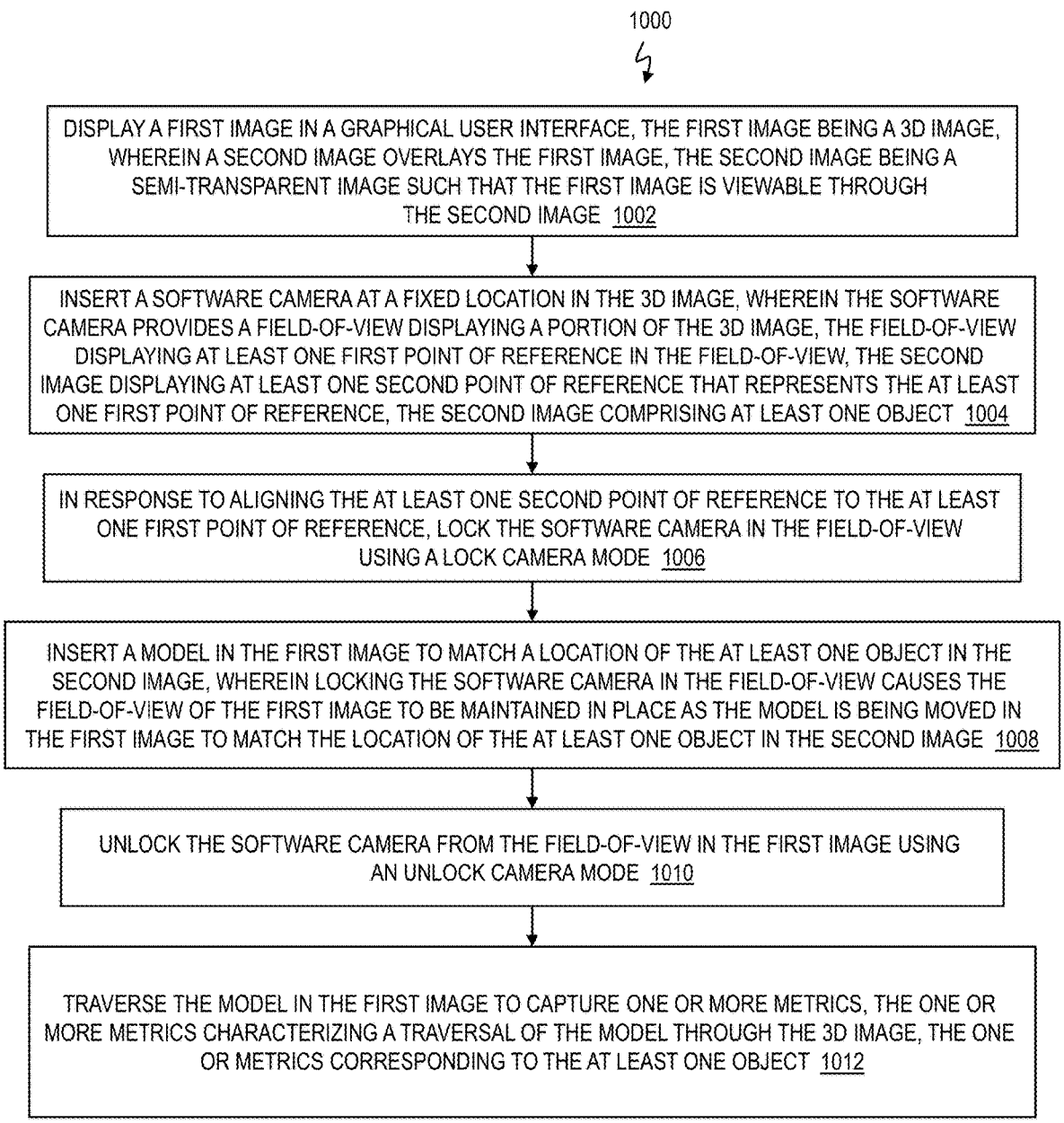
FIG. 10 is a computer-implemented method using the lock software camera mode and the unlock software camera mode to allow editing of the drawing in a 3D image without any shift in the view according to one or more embodiments.

FIG. 10 is a computer-implemented method 1000 for using the lock software camera mode and the unlock software camera mode to allow editing of the drawing in the 3D image without any shift in the view according to one or more embodiments of the invention. The computer-implemented method 1000 can be executed by software application 604 and/or media software application 606 on computer system 602.

At block 1002, software application 604 is configured to display a first image in a graphical user interface, the first image (e.g., 3D image 622) being a three-dimensional (3D) image, wherein a second image (e.g., semi-transparent image 624) overlays the first image, the second image being a semi-transparent image such that the first image is viewable through the second image. An example is depicted in views 802, 804 in FIGS. 8 and 9. At block 1004, software application 604 is configured to insert a software camera 922 at a fixed location in the 3D image (e.g., 3D image 622), wherein the software camera 922 provides a field-of-view displaying a portion of the 3D image, the field-of-view displaying at least one first reference (e.g., objects 832) in the field-of-view, the second image displaying at least one second reference (e.g., objects 842) that represents the at least one first reference, the second image comprising at least one object (e.g., object 844 of interest depicted in FIGS. 8 and 9).

At block 1006, software application 604 is configured to, in response to aligning the at least one second reference (e.g., objects 842) to the at least one first reference (e.g., objects 832), lock the software camera 922 in the field-of-view using a lock software camera mode. At block 1008, software application 604 is configured to insert a model in the first image (e.g., 3D model 834 in 3D image 622) to match a location of the at least one object in the second image (e.g., object 844 of interest in the semi-transparent image 624), wherein locking the software camera 922 in the field-of-view causes the field-of-view of the first image (e.g., 3D image 622) to be maintained in place as the model (e.g., 3D model 834) is being moved in the first image to match the location of the at least one object (e.g., object 844 of interest) in the second image.

At block 1010, software application 604 is configured to unlock the software camera 922 from the field-of-view in the first image using an unlock software camera mode. At block 1012, software application 604 is configured to traverse (or animate) the model (e.g., 3D model 834) in the first image (e.g., 3D image 622) to capture one or more metrics, the one or more metrics characterizing a traversal of the model through the 3D image, the one or metrics corresponding to the at least one object (e.g., object 844 of interest).

In one or more embodiments, locking the software camera 922 in the field-of-view using the lock software camera mode allows a user to edit the first image (e.g., 3D image 622) without the field-of-view moving. Locking the software camera 922 in the field-of-view using the lock software camera mode prevents any other portion (e.g., other 3D points in the 3D point cloud) of the 3D image 622 from being displayed except the portion (e.g., 3D points) in the field-of-view. Locking the software camera 922 in the field-of-view using the lock software camera mode disables one or more functions in the graphical user interface. The one or more functions that are disabled comprise a scroll function, a zoom in function, a zoon out function, a pan function, and an animate function in the 3D image 622.

In one or more embodiments, the 3D image 622 is a 3D point cloud, the 3D point cloud comprising a plurality of 3D data points; and locking the software camera 922 in the field-of-view using the lock software camera mode both captures and freezes predetermined 3D data points of the plurality of 3D data points visible in the field-of-view of the software camera 922, such that no other 3D data points of the plurality of 3D data points in the 3D image 622 can be made visible or moved to during the lock software camera mode.

The software application 604 is configured to display one or more two-dimensional (2D) images (e.g., 2D image 924) of the field-of-view concurrently being displayed in the 3D image 622 during the lock software camera mode, such that any positioning of the model (e.g., 3D model) in the 3D image 622 is simultaneously viewable in the 2D image 924, wherein any functions disabled in the 3D image 622 are unlocked or functioning in the 2D image 924. The unlock software camera mode is configured to permit one or more functions in the graphical user interface to change the field-of-view of the 3D image 622, to move through the 3D image 6222, and to allow the field-of-view to shift as one or more models (e.g., 3D model 834) are being positioned by the user in the 3D image 622.

A selection by the user is permitted in the software application 604 for switching back and forth between the lock software camera mode and the unlock software camera mode. In response to the user selecting the lock software camera mode (e.g., in software application 604) to lock the software camera in the field-of-view and in response to subsequently selecting the unlock software camera mode to modify the field-of-view, another (e.g., subsequent) selection of the lock software camera mode causes a return (by software application 604) to the field-of-view previously selected for the software camera 922 regardless of any previous changes made to the view during the unlock software camera mode, thereby returning the first image (e.g., 3D image 622) to an alignment of the at least one second reference (e.g., objects 842 in semi-transparent image 624) to the at least one first reference (e.g., objects 832).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A computer-implemented method for a software camera lock, the method comprising:
    displaying a first image in a graphical user interface, the first image being a three-dimensional (3D) image, wherein a second image overlays the first image, the second image being a semi-transparent image such that the first image is viewable through the second image;
    inserting a software camera at a fixed location in the 3D image, wherein the software camera provides a field-of-view displaying a portion of the 3D image, the field-of-view displaying at least one first reference in the field-of-view, the second image displaying at least one second reference that represents the at least one first reference, the second image comprising at least one object;
    in response to aligning the at least one second reference to the at least one first reference, locking the software camera in the field-of-view using a lock software camera mode;
    inserting a model in the first image to match a location of the at least one object in the second image, wherein locking the software camera in the field-of-view causes the field-of-view of the first image to be maintained in place as the model is being moved in the first image to match the location of the at least one object in the second image;
    unlocking the software camera from the field-of-view in the first image using an unlock software camera mode; and
    traversing the model in the first image to capture one or more metrics, the one or more metrics characterizing a traversal of the model through the 3D image, the one or metrics corresponding to the at least one object.

2. The computer-implemented method of claim 1, wherein locking the software camera in the field-of-view using the lock software camera mode allows a user to edit the first image without the field-of-view moving in the first image.

3. The computer-implemented method of claim 1, wherein locking the software camera in the field-of-view using the lock software camera mode prevents any other portion of the 3D image from being displayed.

4. The computer-implemented method of claim 1, wherein locking the software camera in the field-of-view using the lock software camera mode disables one or more functions in the graphical user interface.

5. The computer-implemented method of claim 4, wherein the one or more functions that are disabled comprise a scroll function, a zoom in function, a zoon out function, a pan function, and an animate function.

6. The computer-implemented method of claim 1, wherein:
    the 3D image is a 3D point cloud, the 3D point cloud comprising a plurality of 3D data points; and
    locking the software camera in the field-of-view using the lock software camera mode both captures and freezes predetermined 3D data points of the plurality of 3D data points visible in the field-of-view of the software camera, such that no other 3D data points of the plurality of 3D data points can be made visible or moved to during the lock software camera mode.

7. The computer-implemented method of claim 1, further comprising displaying a two-dimensional (2D) image of the field-of-view concurrently being displayed in the 3D image during the lock software camera mode, such that any positioning of the model in the 3D image is simultaneously viewable in the 2D image, wherein any functions disabled in the 3D image are unlocked in the 2D image.

8. The computer-implemented method of claim 1, wherein the unlock software camera mode is configured to permit one or more functions in the graphical user interface to change the field-of-view of the 3D image, to move through the 3D image, and to allow the field-of-view to shift as one or more models are being positioned in the 3D image.

9. The computer-implemented method of claim 1, wherein a selection is permitted for switching back and forth between the lock software camera mode and the unlock software camera mode.

10. The computer-implemented method of claim 1, wherein, in response to selecting the lock software camera mode to lock the software camera in the field-of-view and in response to subsequently selecting the unlock software camera mode to modify the field-of-view, another selection of the lock software camera mode causes a return to the field-of-view previously selected for the software camera regardless of any previous changes made during the unlock software camera mode, thereby returning the first image to an alignment of the at least one second reference to the at least one first reference.

11. A system for a software camera lock, the system comprising:
    a memory having computer readable instructions; and
    one or more processors for executing the computer readable instructions, the computer readable instructions controlling the one or more processors to perform operations comprising:
    displaying a first image in a graphical user interface, the first image being a three-dimensional (3D) image, wherein a second image overlays the first image, the second image being a semi-transparent image such that the first image is viewable through the second image;

inserting a software camera at a fixed location in the 3D image, wherein the software camera provides a field-of-view displaying a portion of the 3D image, the field-of-view displaying at least one first reference in the field-of-view, the second image displaying at least one second reference that represents the at least one first reference, the second image comprising at least one object;

in response to aligning the at least one second reference to the at least one first reference, locking the software camera in the field-of-view using a lock software camera mode;

inserting a model in the first image to match a location of the at least one object in the second image, wherein locking the software camera in the field-of-view causes the field-of-view of the first image to be maintained in place as the model is being moved in the first image to match the location of the at least one object in the second image;

unlocking the software camera from the field-of-view in the first image using an unlock software camera mode; and traversing the model in the first image to capture one or more metrics, the one or more metrics characterizing a traversal of the model through the 3D image, the one or metrics corresponding to the at least one object.

12. The system of claim 11, wherein locking the software camera in the field-of-view using the lock software camera mode allows a user to edit the first image without the field-of-view moving in the first image.

13. The system of claim 11, wherein locking the software camera in the field-of-view using the lock software camera mode prevents any other portion of the 3D image from being displayed.

14. The system of claim 11, wherein:
locking the software camera in the field-of-view using the lock software camera mode disables one or more functions in the graphical user interface; and
the one or more functions that are disabled comprise a scroll function, a zoom in function, a zoon out function, a pan function, and an animate function.

15. The system of claim 11, wherein:
the 3D image is a 3D point cloud, the 3D point cloud comprising a plurality of 3D data points; and
locking the software camera in the field-of-view using the lock software camera mode both captures and freezes predetermined 3D data points of the plurality of 3D data points visible in the field-of-view of the software camera, such that no other 3D data points of the plurality of 3D data points can be made visible or moved to during the lock software camera mode.

16. The system of claim 11, wherein the one or more processors perform the operations further comprising displaying a two-dimensional (2D) image of the field-of-view concurrently being displayed in the 3D image during the lock software camera mode, such that any positioning of the model in the 3D image is simultaneously viewable in the 2D image, wherein any functions disabled in the 3D image are unlocked in the 2D image.

17. The system of claim 11, wherein the unlock software camera mode is configured to permit one or more functions in the graphical user interface to change the field-of-view of the 3D image, to move through the 3D image, and to allow the field-of-view to shift as one or more models are being positioned in the 3D image.

18. The system of claim 11, wherein a selection is permitted for switching back and forth between the lock software camera mode and the unlock software camera mode.

19. The system of claim 11, wherein, in response to selecting the lock software camera mode to lock the software camera in the field-of-view and in response to subsequently selecting the unlock software camera mode to modify the field-of-view, another selection of the lock software camera mode causes a return to the field-of-view previously selected for the software camera regardless of any previous changes made during the unlock software camera mode, thereby returning the first image to an alignment of the at least one second reference to the at least one first reference.

20. A computer program product comprising a computer readable storage medium having program instructions embodied therewith for a software camera lock, the program instructions executable by one or more processors to cause the one or more processors to perform operations comprising:

displaying a first image in a graphical user interface, the first image being a three-dimensional (3D) image, wherein a second image overlays the first image, the second image being a semi-transparent image such that the first image is viewable through the second image;

inserting a software camera at a fixed location in the 3D image, wherein the software camera provides a field-of-view displaying a portion of the 3D image, the field-of-view displaying at least one first reference in the field-of-view, the second image displaying at least one second reference that represents the at least one first reference, the second image comprising at least one object;

in response to aligning the at least one second reference to the at least one first reference, locking the software camera in the field-of-view using a lock software camera mode;

inserting a model in the first image to match a location of the at least one object in the second image, wherein locking the software camera in the field-of-view causes the field-of-view of the first image to be maintained in place as the model is being moved in the first image to match the location of the at least one object in the second image;

unlocking the software camera from the field-of-view in the first image using an unlock software camera mode; and traversing the model in the first image to capture one or more metrics, the one or more metrics characterizing a traversal of the model through the 3D image, the one or metrics corresponding to the at least one object.

* * * * *